United States Patent
Dierberger et al.

(10) Patent No.: US 9,534,783 B2
(45) Date of Patent: Jan. 3, 2017

(54) INSERT ADJACENT TO A HEAT SHIELD ELEMENT FOR A GAS TURBINE ENGINE COMBUSTOR

(75) Inventors: James A. Dierberger, Hebron, CT (US); Masamichi Hongoh, Manchester, CT (US); Dennis J. Sullivan, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 1273 days.

(21) Appl. No.: 13/188,442

(22) Filed: Jul. 21, 2011

(65) Prior Publication Data
US 2013/0019603 A1 Jan. 24, 2013

(51) Int. Cl.
*F23R 3/00* (2006.01)
*F23R 3/06* (2006.01)

(52) U.S. Cl.
CPC ............... *F23R 3/002* (2013.01); *F23R 3/007* (2013.01); *F23R 3/06* (2013.01); *F23R 2900/03042* (2013.01); *Y02T 50/675* (2013.01)

(58) Field of Classification Search
CPC ............. F23R 3/002; F23R 3/007; F23R 3/06; F23R 3/44; F23R 3/46; F23R 3/50; F23R 3/54; F23R 3/60; F23R 2900/00005; F23R 2900/00012; F23R 2900/03041; F23R 2900/03042; F23R 29/03044; F23R 3/08; F01D 9/023; F01D 11/005; F16J 15/061
USPC ................. 60/752, 753, 754, 755, 756, 757, 758,60/759, 760; 277/627, 630, 637; 9/752, 753, 9/754, 755, 756, 757, 758, 759, 760
See application file for complete search history.

(56) References Cited

U.S. PATENT DOCUMENTS

| | | | | |
|---|---|---|---|---|
| 4,422,300 A | * | 12/1983 | Dierberger et al. | ............ 60/757 |
| 4,567,730 A | | 2/1986 | Scott | |
| 4,655,044 A | | 4/1987 | Dierberger et al. | |
| 5,144,793 A | * | 9/1992 | Able | ...................... F23R 3/045 60/757 |
| 5,221,096 A | * | 6/1993 | Heldreth et al. | ............... 277/630 |
| 5,277,936 A | * | 1/1994 | Olson | ....................... C23C 4/06 427/201 |
| 5,435,139 A | * | 7/1995 | Pidcock et al. | ................. 60/757 |
| 5,687,572 A | * | 11/1997 | Schrantz et al. | ................ 60/753 |
| 5,799,491 A | | 9/1998 | Bell et al. | |
| 6,203,025 B1 | * | 3/2001 | Hayton | ........................ 277/644 |
| 6,397,603 B1 | | 6/2002 | Edmondson et al. | |
| 6,397,765 B1 | * | 6/2002 | Becker | .......................... 110/336 |
| 6,431,825 B1 | * | 8/2002 | McLean | ........................ 415/135 |
| 6,470,685 B2 | * | 10/2002 | Pidcock et al. | ................. 60/752 |
| 6,612,248 B2 | * | 9/2003 | Becker | .......................... 110/336 |

(Continued)

FOREIGN PATENT DOCUMENTS

| EP | 1389714 | 2/2004 |
|---|---|---|
| EP | 1591725 | 11/2005 |
| EP | 2354656 | 8/2011 |

OTHER PUBLICATIONS

European Search Report for EP Application No. 121796894.9 completed Mar. 25, 2015.

*Primary Examiner* — Phutthiwat Wongwian
*Assistant Examiner* — Rene Ford
(74) *Attorney, Agent, or Firm* — Carlson, Gaskey & Olds, P.C.

(57) ABSTRACT

A combustor of a gas turbine engine includes a heat shield panel mounted to a support shell and an insert at least partially between opposed surfaces of the support shell and the heat shield panel, the insert exposed to a combustion chamber, and the insert being flush with a hot side of the heat shield.

25 Claims, 5 Drawing Sheets

(56) References Cited

U.S. PATENT DOCUMENTS

| | | | |
|---|---|---|---|
| 6,675,586 B2* | 1/2004 | Maghon | 60/796 |
| 6,702,549 B2* | 3/2004 | Tiemann | 415/135 |
| 6,705,832 B2* | 3/2004 | Tiemann | 415/116 |
| 6,711,899 B2* | 3/2004 | Bast et al. | 60/752 |
| 6,718,774 B2* | 4/2004 | Razzell | 60/798 |
| 6,901,757 B2* | 6/2005 | Gerendas | 60/752 |
| 7,090,224 B2* | 8/2006 | Iguchi et al. | 277/603 |
| 7,090,459 B2* | 8/2006 | Bhate et al. | 415/1 |
| 7,093,439 B2* | 8/2006 | Pacheco-Tougas et al. | 60/752 |
| 7,140,185 B2* | 11/2006 | Burd | 60/752 |
| 7,146,815 B2* | 12/2006 | Burd | 60/752 |
| 7,217,081 B2* | 5/2007 | Scheurlen et al. | 415/1 |
| 7,360,769 B2* | 4/2008 | Bennett | 277/641 |
| 7,549,290 B2* | 6/2009 | Holt et al. | 60/725 |
| 7,665,307 B2* | 2/2010 | Burd et al. | 60/753 |
| 7,677,044 B2* | 3/2010 | Barbeln et al. | 60/752 |
| 7,771,159 B2* | 8/2010 | Johnson et al. | 415/135 |
| 7,849,694 B2* | 12/2010 | Dahlke et al. | 60/756 |
| 7,954,325 B2* | 6/2011 | Burd et al. | 60/752 |
| 8,006,498 B2* | 8/2011 | Tschirren et al. | 60/756 |
| 8,052,155 B2* | 11/2011 | Amos et al. | 277/644 |
| 8,161,752 B2* | 4/2012 | Yankowich et al. | 60/752 |
| 8,434,999 B2* | 5/2013 | Amaral et al. | 415/136 |
| 8,490,399 B2* | 7/2013 | Nordlund | 60/752 |
| 8,695,989 B2* | 4/2014 | Dahlke et al. | 277/644 |
| 2003/0010038 A1 | 1/2003 | Maghon | |
| 2005/0073114 A1* | 4/2005 | Amos et al. | 277/644 |
| 2005/0247062 A1* | 11/2005 | Jeppel et al. | 60/752 |
| 2006/0037321 A1* | 2/2006 | Tiemann et al. | 60/722 |
| 2006/0137351 A1* | 6/2006 | Rathmann | 60/752 |
| 2007/0180828 A1 | 8/2007 | Webb | |
| 2009/0085305 A1* | 4/2009 | Demiroglu et al. | 277/637 |
| 2009/0308077 A1* | 12/2009 | Shelley et al. | 60/752 |
| 2013/0042631 A1* | 2/2013 | Jadhav et al. | 60/800 |

* cited by examiner

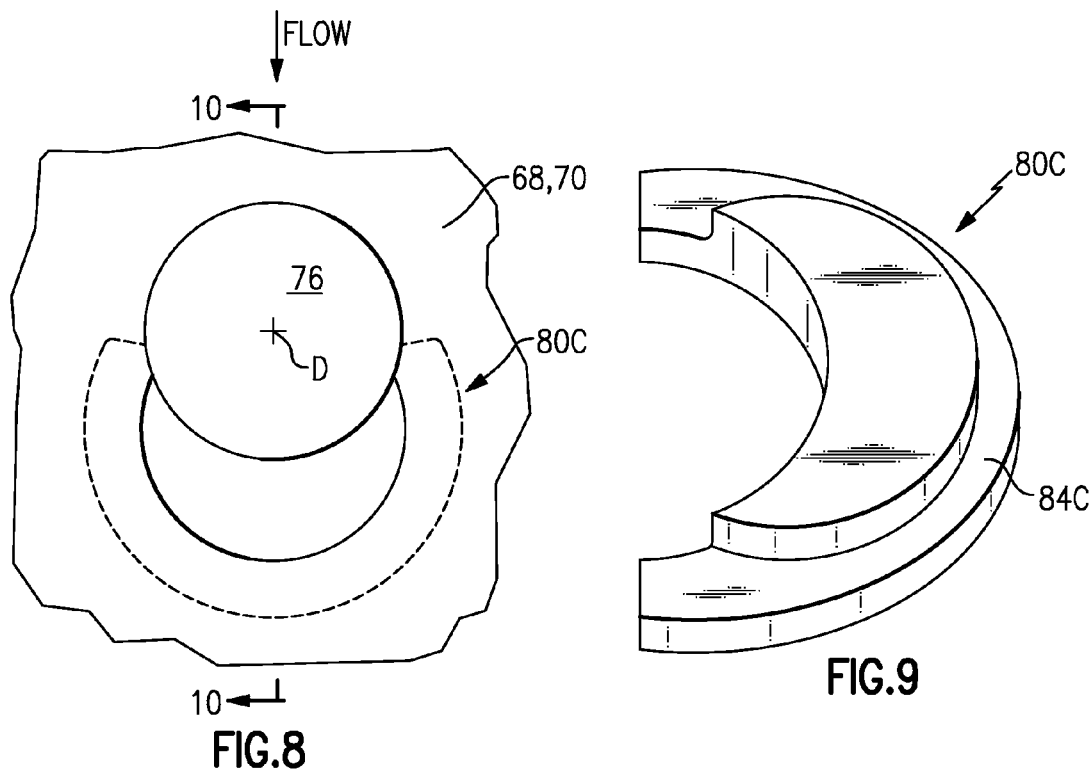
FIG.8
FIG.9
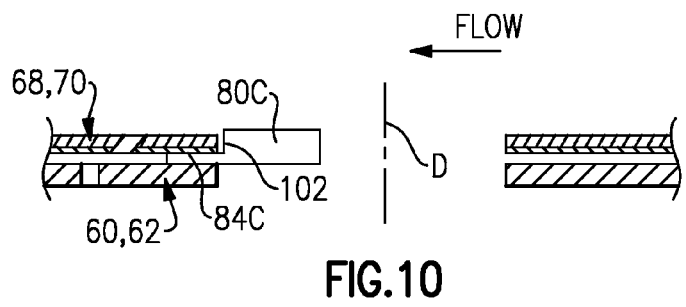
FIG.10
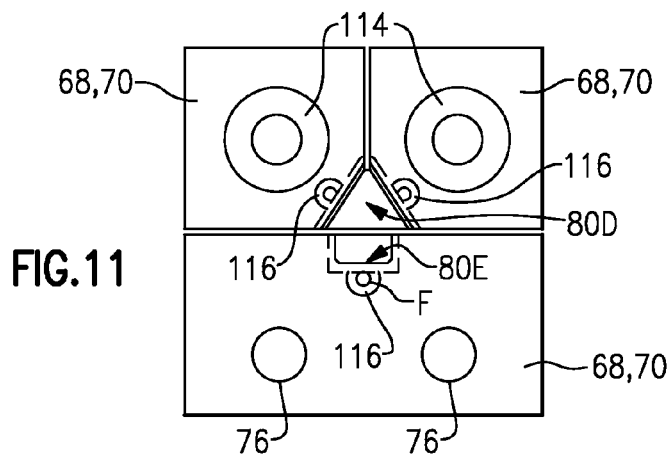
FIG.11

INSERT ADJACENT TO A HEAT SHIELD ELEMENT FOR A GAS TURBINE ENGINE COMBUSTOR

BACKGROUND

The present disclosure relates to a gas turbine engine combustor, and more particularly to a heat shield liner panel arrangement.

A gas turbine engine includes a compressor to compress air that mixes with fuel and is channeled to a combustor wherein the mixture is ignited within a combustion chamber to generate hot combustion core gases. At least some combustors include combustor liners to channel the combustion gases to a turbine which extracts energy from the combustion core gases to power the compressor, as well as produce useful work to propel an aircraft in flight or to power a load, such as an electrical generator.

Some gas turbine combustors have evolved from full hoop structures to full hoop shells with heat shield panels. Heat shield panels may have relatively low durability due to local hot spots that may cause stress and cracking. Hot spots are raised temperature areas where component properties may rapidly degrade and thereby affect the durability of the component. Hot spots are conventionally combated with more cooling air, however, this may have a potential negative effect on combustor emissions, pattern factor, and profile.

SUMMARY

A combustor of a gas turbine engine according to an exemplary aspect of the present disclosure includes a heat shield panel mounted to a support shell and an insert adjacent to the support shell and the heat shield panel, the insert exposed to a combustion chamber.

A combustor of a gas turbine engine according to an exemplary aspect of the present disclosure includes an insert adjacent to a support shell between a first heat shield panel and a second heat shield panel, the insert exposed to a combustion chamber.

A method of protecting a combustor according to an exemplary aspect of the present disclosure includes locating an insert at a combustor hot spot adjacent to a support shell and a heat shield panel.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 8 is a top perspective view of a heat shield panel combustor component with another non-limiting embodiment of an insert;

FIG. 9 is a top view of the insert of FIG. 8;

FIG. 10 is a cross sectional view of a heat shield panel combustor component with the insert of FIG. 8; and FIG. 11 is a top perspective view of a heat shield panel combustor component with another non-limiting embodiment of an insert.

DETAILED DESCRIPTION

Figure 1:
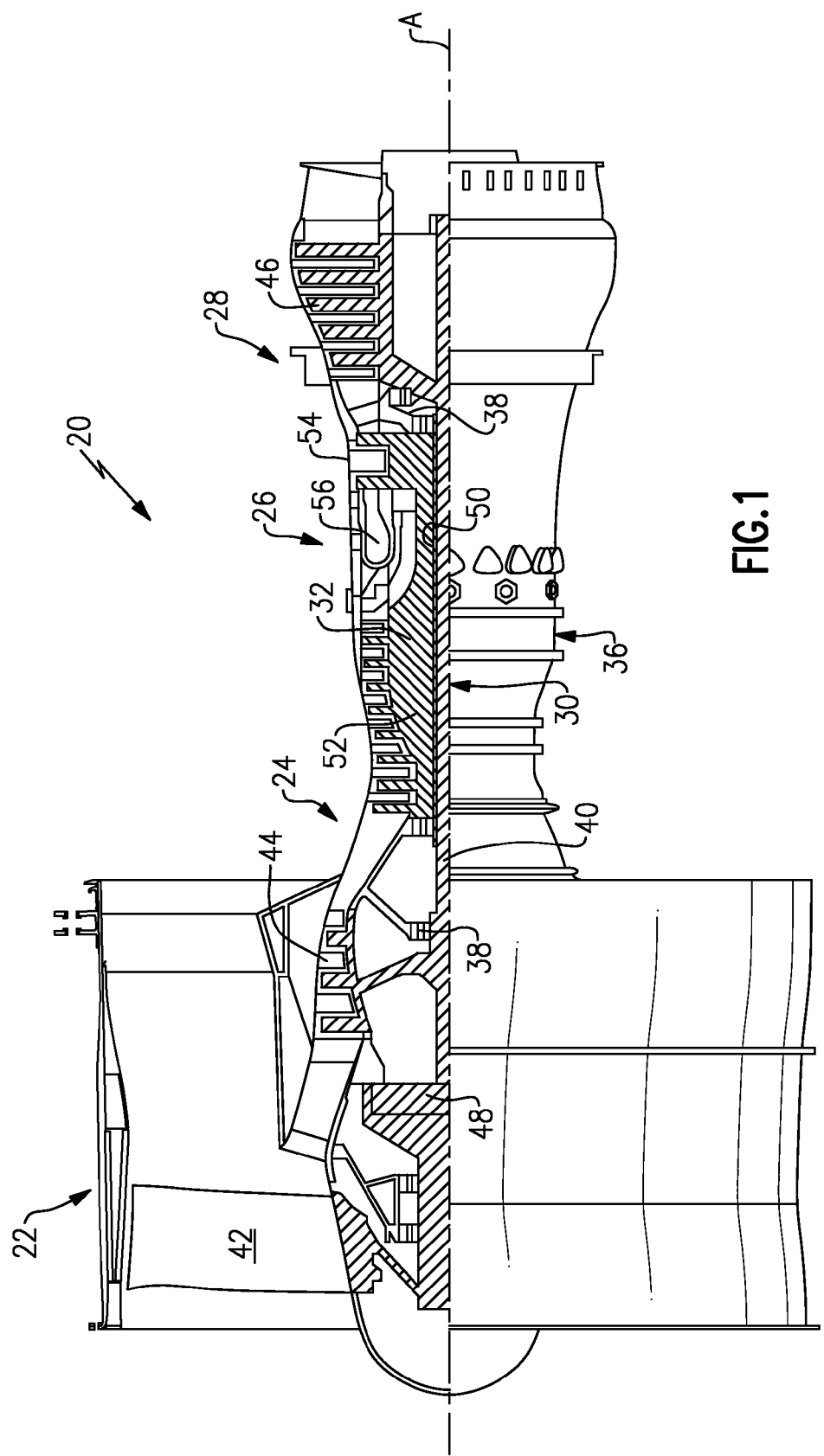
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric to one-another and rotate about the engine central longitudinal axis A that is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
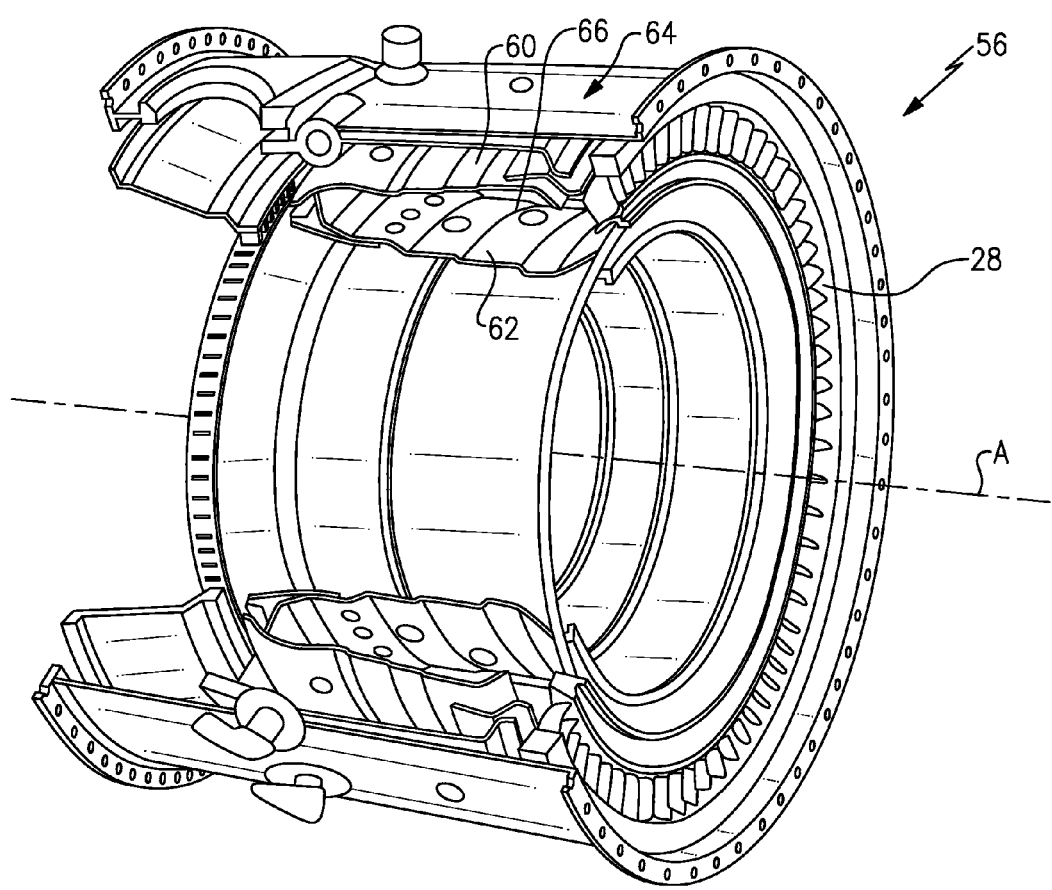
FIG. 2 is a perspective partial sectional view of an exemplary combustor that may be used with the gas turbine engine shown in FIG. 1.

With reference to FIG. 2, the combustor 56 generally includes an outer shell 60 and an inner shell 62 within a combustor case 64. The outer shell 60 and the inner shell 62 line an annular combustion chamber 66 that extends toward and communicates with the turbine section 28. It should be understood that various combustor arrangements such as a can combustor as well as other high temperature components such as turbine components may alternatively benefit herefrom.

Figure 3:
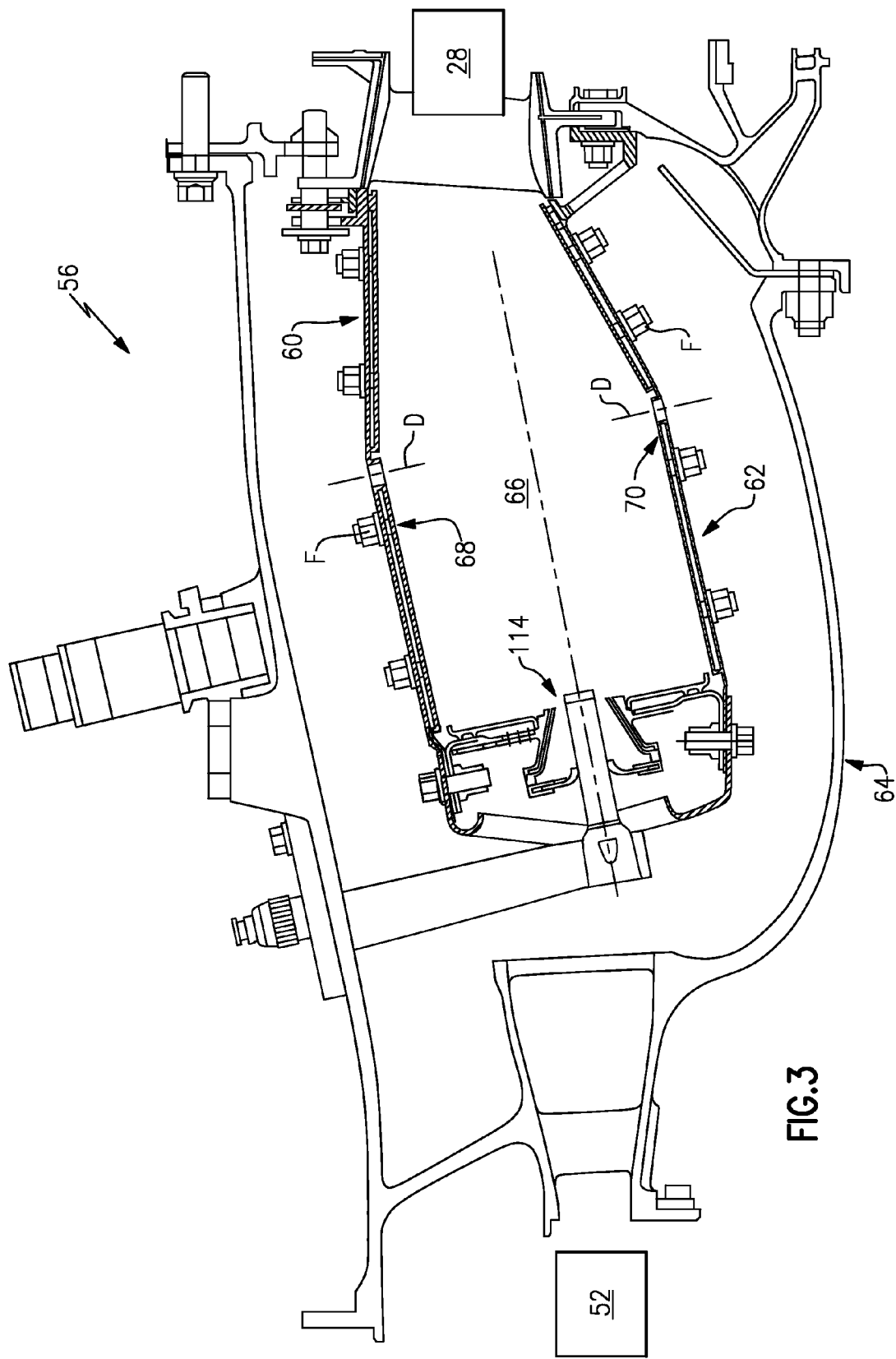
FIG. 3 is a cross-sectional view of an exemplary combustor that may be used with the gas turbine engine shown in FIG. 2.

With reference to FIG. 3, an array of heat shield panels 68, 70 are respectively supported by the outer and inner shells 60, 62 around the combustion chamber 66. The array of heat shield panels 68 line the hot side of the outer shell 60, while the array of heat shield panels 70 line the hot side of the inner shell 62. The heat shield panels 68, 70 may be manufactured of, for example, a nickel based super alloy or ceramic material. Fastener assemblies F such as studs and nuts may be used to connect each of the heat shield panels 68, 70 to the respective inner and outer shells 60, 62 to provide a floatwall type array. The heat shield panels 68, 70 may be generally annular in shape and extend toward the turbine section 28. It should be understood that various numbers, types, and arrangements of heat shield panels may alternatively or additionally be provided.

Figure 4:
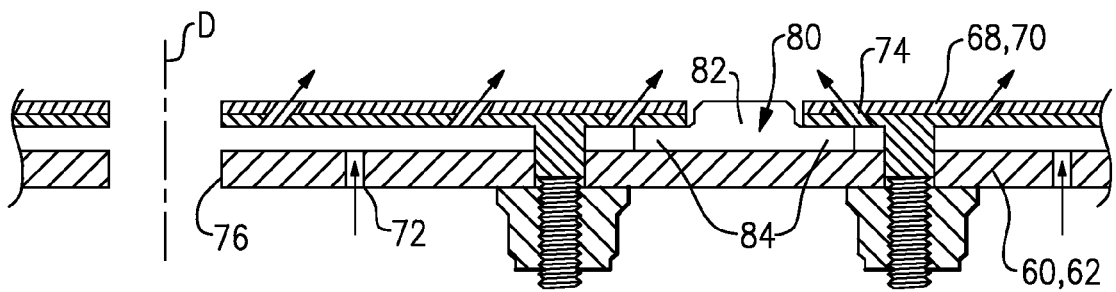
FIG. 4 is a cross sectional view of a heat shield panel combustor component.

With reference to FIG. 4, impingement cooling holes 72 penetrate through the inner and outer shells 60, 62 to communicate coolant, such as secondary cooling air, into the space between the inner and outer shells 60, 62 and the respective heat shield panels 68, 70. Film cooling holes 74 penetrate each of the heat shield panels 68, 70 to promote the formation of a film of cooling air. A multiple of dilution holes 76 (one shown) penetrate both the heat shield panels or floatwalls 68, 70 and the respective inner and outer support shells 60, 62, each along a common axis D to inject dilution air that facilitates combustion and the release of additional energy from the fuel.

An insert 80 is located within or between any or each of the heat shield panels 68, 70 and at least partially sandwiched between heat shield panels 68, 70 and the respective shells 60, 62. It should be understood that the illustrated location of the insert 80 with respect to heat shield panels 68, 70 is merely one disclosed non-limiting embodiment and that other locations and heat shield panel arrangements may alternatively or additionally be provided.

Figure 5:
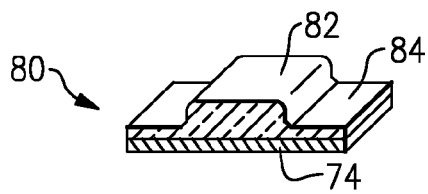
FIG. 5 is a perspective view of an insert for the heat shield panel combustor component further shown in FIG. 4.

The insert 80 may be located at a combustor hot spot defined as a location where an incomplete mixing of fuel, i.e., a fuel rich region, may occur. The hot spot may be within a single heat shield panel 68, 70 or at an interface between a multiple of heat shield panels 68, 70. The insert 80 may be manufactured of a ceramic matrix composite material or high temperature metal alloy material that is more heat resistant than the heat shield panels 68, 70. The insert 80 may additionally include a thermal barrier coating layer 74 (FIG. 5) to minimize thermal conduction from shells 60, 62.

Figure 6:
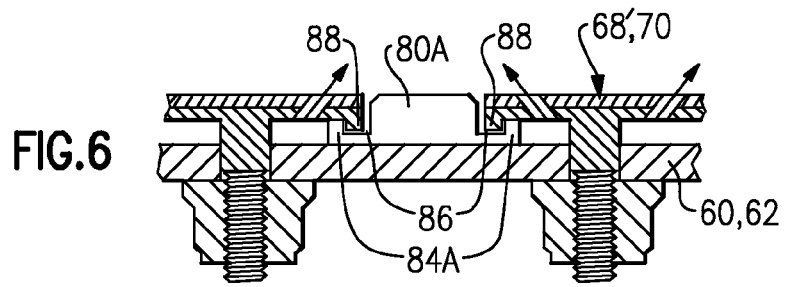
FIG. 6 is a cross sectional view of another non-limiting embodiment of a heat shield panel combustor component with another non-limiting embodiment of an insert.

This insert 80 may be approximately the size and shape of the potential hot spot and may replace a portion of the heat shield panel that may be otherwise inadequate to resist the elevated temperatures of the hot spot. In one disclosed non-limiting embodiment the insert 80 includes a central area 82 that is generally flush or coplanar with a hot surface of the heat shield panels 68, 70 with flanges 84 which extend and are sandwiched between the respective heat shield panels 68, 70 and the respective support shell 60, 62. In this disclosed non-limiting embodiment, the central area 82 may be approximately 0.25-0.5 inches thick (6.4-12.7 mm). The step shape of the central area 82 and the flanges 84 retain the insert 80 as the flanges 84 are trapped between the respective heat shield panels 68, 70 and the shell 60, 62. The insert 80 may be positioned to operate as near to isothermal as possible so that hot spot stress is minimized With respect to FIG. 6, insert 80A according to another non-limiting embodiment includes a retaining groove 86 in each of the flanges 84A that receives a respective lip 88 of the heat shield panels 68, 70. The retention interface of the groove 86 and lip 88 facilitates retention of the insert 80A throughout thermal excursions.

Figure 7:
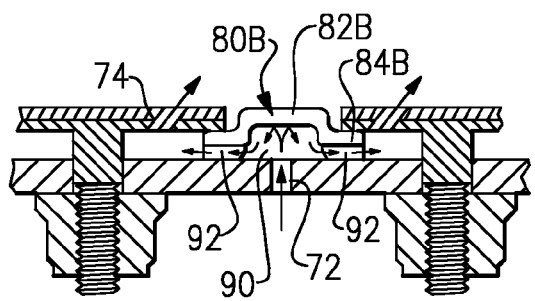
FIG. 7 is a cross sectional view of another non-limiting embodiment of a heat shield panel combustor component with another non-limiting embodiment of an insert.

With respect to FIG. 7, insert 80B according to another non-limiting embodiment includes a generally open area 90 formed in the central area 82B, opposite a hot side thereof. That is, the open area 90 is under the hot side of the central area 82B to facilitate impingement cooling. Insert apertures 92 directed transverse to the impingement cooling holes 72 extend through flanges 84B. The generally open area 90 receives secondary cooling air from at least one impingement cooling hole 72 for communication through the insert apertures 90 then through the film cooling holes 74. The secondary cooling air may thereby be readily controlled with the size and arrangement of insert apertures 92 in the area adjacent to the adjacent heat shield panels 68, 70 which may heretofore have been subject to relatively high thermal excursions. Such an arrangement may be particularly advantageous adjacent to an edge of the heat shield panels 68, 70.

With respect to FIG. 8, an insert 80C according to another non-limiting embodiment is located adjacent to a dilution hole 76 offset from the dilution axis D defined thereby. The insert 80C is of a generally crescent shape (FIG. 9) with a step 102 in cross-section to fit at least partially define the dilution hole 76. The inset 80C is generally flush with the respective heat shield panel 68, 70 relative to the support shell 60, 62. A flange 84C defined by the step 102 extends between the respective heat shield panels 68, 70 and the support shell 60, 62 for retention therebetween (see FIG. 10). The shape of the insert 80C essentially fills in a hot spot that typically may occur downstream of the dilution hole 76.

With respect to FIG. 11, an insert 80D, 80E may be of various shapes, such as, for example, rectangular, triangular, or other shapes, to fill in hot spot areas such as that may occur adjacent, for example, fuel nozzle injectors 114 (FIG. 2). The inserts 80D, 80E may additionally include tabs 116 that receive one or more fastener assemblies F for positive retention of the insert 80D, 80E and the heat shield panels 68, 70. It should be understood that various insert shapes may additionally or alternatively be provided to match the shape and location of a hot spot.

Through a reduction in cooling air usage to combat the hot spot, more cooling air is available for emissions, profile and pattern factor control. High temperature hot spot stress is also reduced as the insert is maintained close to isothermal.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A combustor of a gas turbine engine comprising:
a support shell;
a heat shield panel mounted to said support shell;
an insert including a central area and at least one flange extending from said central area, said at least one flange at least partially sandwiched between opposed surfaces of said support shell and said heat shield panel, said central area of said insert exposed to a combustion chamber, and said central area of said insert extending from said at least one flange in a direction toward said combustion chamber such that said central area is flush with a hot side surface of said heat shield panels;
wherein said heat shield panel includes a heat shield dilution hole and said support shell includes a support shell dilution hole along a common dilution axis, said insert offset from said dilution axis; and
wherein said central area is at least partially received in one of said heat shield dilution hole and said support shell dilution hole.

2. The combustor as recited in claim 1, wherein said insert is located at a combustor hot spot.

3. The combustor as recited in claim 1, wherein said heat shield panel includes at least one film cooling hole.

4. The combustor as recited in claim 1, wherein said support shell includes at least one impingement cooling hole.

5. The combustor as recited in claim 1, wherein said insert extends at least partially between said heat shield panel and said support shell.

6. The combustor as recited in claim 1, wherein said insert is arcuate in shape relative to a reference plane perpendicular to said common dilution axis.

7. The combustor as recited in claim 1, comprising at least one fastener fixedly securing said insert between said support shell and said heat shield panel.

8. The combustor as recited in claim 1, wherein said insert is made of a first material, and said heat shield panel is made of a second, different material, and said first material is configured to have a relatively higher thermal resistance than said second material.

9. The combustor as recited in claim 8, wherein a thermal barrier coating is disposed on surfaces of said insert contacting said support shell.

10. A combustor of a gas turbine engine comprising:
a support shell;
a heat shield panel mounted to said support shell;
an insert at least partially between opposed surfaces of said support shell and said heat shield panel, said insert exposed to a combustion chamber, and said insert being flush with a hot side of said heat shield;
wherein said heat shield panel includes a heat shield dilution hole and said support shell includes a support shell dilution hole along a common dilution axis, said insert offset from said dilution axis; and
wherein said insert is located between said heat shield panel and said support shell, and a portion of said insert is placed within and partially around a perimeter of at least one of said heat shield dilution hole and said support shell dilution hole.

11. The combustor as recited in claim 10, wherein said insert includes a main body and a flange extending at least partially along a perimeter of said main body, said main body being crescent shaped, and said flange being arcuate shaped.

12. The combustor as recited in claim 11, wherein each of said main body and said flange partially follows the contour of said at least one of said heat shield dilution hole and said support shell dilution hole.

13. The combustor as recited in claim 11, wherein said main body is flush with said hot side of said heat shield panel, and said flange is between said opposed surfaces of said support shell and said heat shield panel.

14. The combustor as recited in claim 13, wherein said flange is at least partially sandwiched between said support shell and said heat shield panel.

15. The combustor as recited in claim 10, wherein said insert is made of a first material, and said heat shield panel is made of a second, different material, and said first material is configured to have a relatively higher thermal resistance than said second material.

16. The combustor as recited in claim 15, wherein said insert is manufactured of ceramic matrix composite.

17. A combustor of a gas turbine engine comprising:
a support shell;
a heat shield panel mounted to said support shell; and
an insert including a central area and at least one flange extending from said central area, said central area being crescent shaped and said at least one flange being arcuate shaped, said at least one flange at least partially sandwiched between opposed surfaces of said support shell and said heat shield panel, said central area of said insert exposed to a combustion chamber, and said central area of said insert extending from said at least one flange in a direction toward said combustion chamber such that said central area is flush with a hot side surface of said heat shield panel.

18. The combustor as recited in claim 17, wherein said insert is located at a combustor hot spot.

19. The combustor as recited in claim 17, wherein said insert is made of a first material, and said heat shield panel is made of a second, different material, and said first material is configured to have a relatively higher thermal resistance than said second material.

20. The combustor as recited in claim 19, wherein said insert is manufactured of ceramic matrix composite.

21. The combustor as recited in claim 17, wherein said heat shield panel includes at least one film cooling hole, and said support shell includes at least one impingement cooling hole.

22. The combustor as recited in claim 17, wherein said heat shield panel includes a heat shield dilution hole and said support shell includes a support shell dilution hole along a common dilution axis, and said central area is at least partially received in one of said heat shield dilution hole and said support shell dilution hole such that said insert is offset from said common dilution axis.

23. The combustor as recited in claim 22, wherein said insert extends at least partially between said heat shield panel and said support shell.

24. The combustor as recited in claim 23, wherein said insert is arcuate in shape relative to a reference plane perpendicular to said common dilution axis.

25. The combustor as recited in claim 24, wherein a cross-sectional profile of said central area and said at least one flange defines a step relationship.

* * * * *

UNITED STATES PATENT AND TRADEMARK OFFICE
CERTIFICATE OF CORRECTION

| | |
|---|---|
| PATENT NO. | : 9,534,783 B2 |
| APPLICATION NO. | : 13/188442 |
| DATED | : January 3, 2017 |
| INVENTOR(S) | : James A. Dierberger, Masamichi Hongoh and Dennis J. Sullivan |

It is certified that error appears in the above-identified patent and that said Letters Patent is hereby corrected as shown below:

In the Claims

In Claim 1, Column 5, Line 16; after "shield" replace "panels" with --panel--

In Claim 12, Column 6, Line 5; after "follows" replace "the" with --a--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*